(12) United States Patent
Dhanakshirur et al.

(10) Patent No.: US 8,260,617 B2
(45) Date of Patent: Sep. 4, 2012

(54) AUTOMATING INPUT WHEN TESTING VOICE-ENABLED APPLICATIONS

(75) Inventors: Girish Dhanakshirur, Delray Beach, FL (US); James Lewis, Delray Beach, FL (US)

(73) Assignee: Nuance Communications, Inc., Burlington, MA (US)

( * ) Notice: Subject to any disclaimer, the term of this patent is extended or adjusted under 35 U.S.C. 154(b) by 1383 days.

(21) Appl. No.: 11/108,289

(22) Filed: Apr. 18, 2005

(65) Prior Publication Data

US 2006/0235699 A1  Oct. 19, 2006

(51) Int. Cl.
 G10L 21/00 (2006.01)
 G10L 15/00 (2006.01)
 G10L 13/00 (2006.01)
 H04M 1/64 (2006.01)
 G06F 9/44 (2006.01)

(52) U.S. Cl. ............ 704/270; 704/270.1; 704/275; 704/231; 704/258; 379/88.01; 379/88.03; 379/88.04; 717/124

(58) Field of Classification Search .......... 704/270, 704/270.1, 375, 275; 717/124; 379/88.01, 379/88.03, 88.04
See application file for complete search history.

(56) References Cited

U.S. PATENT DOCUMENTS

| 6,088,669 | A | 7/2000 | Maes |
| 6,173,266 | B1 * | 1/2001 | Marx et al. ............ 704/270 |
| 6,185,530 | B1 | 2/2001 | Ittycheriah et al. |
| 6,275,792 | B1 | 8/2001 | Lewis |
| 6,321,198 | B1 * | 11/2001 | Hank et al. ............ 704/270 |
| 6,370,503 | B1 | 4/2002 | Ortega et al. |
| 6,526,380 | B1 | 2/2003 | Thelen et al. |
| 6,622,121 | B1 * | 9/2003 | Crepy et al. ............ 704/243 |
| 6,914,962 | B2 * | 7/2005 | Neary ............ 379/10.02 |
| 6,957,420 | B2 * | 10/2005 | Hand et al. ............ 717/125 |
| 7,016,847 | B1 * | 3/2006 | Tessel et al. ............ 704/275 |
| 7,043,435 | B2 * | 5/2006 | Knott et al. ............ 704/270 |
| 7,117,158 | B2 * | 10/2006 | Weldon et al. ............ 704/275 |
| 7,308,079 | B2 * | 12/2007 | Creamer et al. ............ 379/27.04 |

(Continued)

FOREIGN PATENT DOCUMENTS

WO  WO 03/052739 A1 *  6/2003

OTHER PUBLICATIONS

A. K. Sinha, S. R. Klemmer, and J. A. Landay, "Embarkingon Spoken-Language NL Interface Design," InternationalJournal of Speech Technology, vol. 5, pp. 159-169, 2002.*

(Continued)

*Primary Examiner* — Paras D Shah
(74) *Attorney, Agent, or Firm* — Wolf, Greenfield & Sacks, P.C.

(57) ABSTRACT

A method for automating an input process during a testing of a voice-enabled application so that a tester is not required to manually respond to each prompt of the voice-enabled application. The method including the step of identifying a session input store that includes input data associated with voice-enabled application prompts and the step of executing the voice-enabled application. The voice-enabled application can prompt for user input that is to be used when performing a speech processing task. Input data from the session input store can be automatically extracted responsive to the prompting and used in place of manually entered input. The speech processing service can perform the speech processing task based upon the extracted data.

19 Claims, 3 Drawing Sheets

U.S. PATENT DOCUMENTS

| | | | | |
|---|---|---|---|---|
| 7,424,433 | B2* | 9/2008 | Da Palma et al. | 704/275 |
| 7,440,895 | B1* | 10/2008 | Miller et al. | 704/244 |
| 7,562,019 | B2* | 7/2009 | Cohen et al. | 704/270 |
| 7,712,031 | B2* | 5/2010 | Law et al. | 715/728 |
| 8,046,227 | B2* | 10/2011 | Starkie | 704/270.1 |
| 2002/0077823 | A1* | 6/2002 | Fox et al. | 704/260 |
| 2002/0169613 | A1* | 11/2002 | Damiba | 704/270.1 |
| 2003/0144846 | A1* | 7/2003 | Denenberg et al. | 704/277 |
| 2003/0236672 | A1* | 12/2003 | Aaron et al. | 704/277 |
| 2004/0015351 | A1* | 1/2004 | Gandhi et al. | 704/240 |
| 2004/0083457 | A1* | 4/2004 | Boucher | 717/129 |
| 2005/0091057 | A1* | 4/2005 | Phillips et al. | 704/270.1 |
| 2005/0131708 | A1* | 6/2005 | Palma et al. | 704/275 |
| 2005/0283764 | A1* | 12/2005 | Chiu | 717/125 |
| 2006/0069568 | A1* | 3/2006 | Passaretti et al. | 704/270 |
| 2006/0224392 | A1* | 10/2006 | Kershaw et al. | 704/270.1 |

OTHER PUBLICATIONS

Scholz, K. W. "Beyond SALT Versus VoiceXML: Coping With the Wealth of Standards in Speech and Multimodal Self-Service Applications" TCM Customer Inter@ction Solutions. vol. 21 Issue 9, p. 52. Mar. 2003.*

K. K J. Turner. Analysing interactive voice services. Computer Networks, 45(5):665-685, Aug. 2004.*

Moody, M.P., et al., "On the Confidence Level of Speaker Identification Using Statistical Measures on Reflection Coefficients", Proc. of 4th Australian Int'l. Conf. on Speech Science & Technology, pp. 477-482, (1992).

Shaouy, W., et al., "A Pervasive Personality Type Determination System", IBM Tech. Disc. Bull., No. 444, p. 646, (Apr. 2001).

Ponceleon, D., et al., "Automatic Discovery of Salient Segments in Imperfect Speech Transcripts", CIKM '01, pp. 490-497, (Nov. 5-10, 2001).

Feng, J., et al., "Webtalk: Mining Websites for Automatically Building Dialog Systems", IEEE, pp. 168-173, (2003).

Vermuri, S., et al., "Improving Speech Playback Using Time Compression & Speech Recognition", CHI 2004, vol. 6, No. 1, pp. 295-302, (Apr. 24-29, 2004).

* cited by examiner

AUTOMATING INPUT WHEN TESTING VOICE-ENABLED APPLICATIONS

BACKGROUND

1. Field of the Invention

The present invention relates to the field of testing voice-enabled applications and, more particularly, to utilizing a session file store to automatically respond to prompts for input during system development and testing.

2. Description of the Related Art

Performing rapid and accurate speech processing tasks can require highly specialized, sophisticated, and resource robust hardware and software, especially when real-time or near real-time processing is desired and/or when speech processing tasks are performed for a diverse population having different speech characteristics. For example, in performing speech recognition tasks, received speech utterances have to be parsed into processable segments, each utterance segment has to be converted into a symbolic representation, these symbolic representations compared against valid words, and these words processed according to grammar rules and/or utterance contexts, where the resulting textual results can then be deciphered to determine what programmatic actions are to be taken responsive to the received speech input. Throughout this process, speaker-dependent characteristics, such as idiom, speaker language, accent, timber, and the like, can be determined and suitable adjustment can be made to more accurately perform speech processing tasks.

To efficiently perform these tasks within a distributed environment, a common practice is to establish various speech processing engines, like automatic speech recognition engines and text-to-speech conversion engines. Often these speech processing engines will be arranged as a cluster of speech processing engines that handle a high volume of speech processing tasks, each cluster consisting of numerous approximately identical engines where the processing load is balanced across the approximately equivalent engines of a cluster to assure each received task can be handled within acceptable performance constraints.

When voice-enabled applications require a speech processing task to be performed, the task is conveyed to the appropriate cluster and a result is returned to the requesting voice-enabled application. To efficiently utilize speech processing resources and to load-balance received tasks among various engines in a cluster, speech processing tasks can be handled in discrete and independent segments, called dialogue turns. Notably, different turn-based subtasks can be processed in parallel or in series by different ones of the speech engines of the cluster. Results of the subtasks can be combined into a task result, which is conveyed to the requesting voice-enabled application.

While the structure described previously can be highly efficient for handling a significant load for a large number of voice-enabled applications using a minimal amount of speech processing resources, it can be extremely difficult to test and develop programs for this complex and interdependent environment. Conventional approaches for testing voice-enabled applications deployed in the aforementioned environment all have shortcomings.

One conventional approach is to deploy code to be tested within a production environment or a non-production equivalent of the production environment and to have a tester interact with the environment as if he/she were a typical user. For example, assume a typical user of a voice-enabled application is a telephone user and assume that the deployed code being tested is for a platform service that the voice-enabled platform uses. A tester can dial a telephone number to be connected with the environment that is being used to test the deployed code. The tester can then respond to each prompt and can listen to the speech output. If errors occur, the tester can examine an associated log file, modify code, deploy the code, and repeat the process. While this process provides a realistic means to test code deployed in a highly interdependent environment, such as platform service code, the process is tedious, time consuming, and costly.

Another conventional approach is to utilize a simulator in which platform services execute locally. In the simulator, a local version of speech service engines, a voice-enabled browser, and a voice-enabled application can execute. A tester interacting with the simulator can provide speech input through a microphone and can hear generated speech output through an external speaker. These interactions, however, can be disturbing to others working in a shared work environment. The interactions can also be inaccurate in noisy environments, where recognition accuracy can be poor. Additionally, a tester who has particular speech characteristics can effectively and often inadvertently train the speech service engines to operate in a speaker dependent fashion. It can be difficult, for example, for a tester to test speech recognition paths other than those default paths corresponding to the tester's speech characteristics, which can include prosody, idiom, and grammar.

One technique to overcome problems with testing based upon speech input, is to permit a tester to provide text based input that simulates speech input. For example, when testing a speech recognition engine, a tester can provide textual input providing one or more textual speech converted results and associated confidence scores. These textual results and scores can be used as a testing substitute for speech-to-text results otherwise generated by speech-to-text converting a speech utterance. The use of textual input to test speech recognition code that normally requires audio input can be highly beneficial in many situations as precisely manipulating confidence scores, n-best lists, and program code pathways can be extremely difficult using audio input. That is, the level of precision and control added through the use of text based input during testing can expedite and enhance the thoroughness of the testing process.

Regardless of which of the above conventional testing methodologies are used, a tester typically is required to repetitively respond to the same prompts over and over again. For example, when testing a deep dialog branch for a session, a tester may have to respond to numerous dialog prompts (via phone input, via spoken simulator input, or text based similar input) before reaching a dialog branch that needs to be tested. Continuously responding to prompts in order to reach a point of interest in code can be very unproductive and aggravating. Additionally, a bored tester lulled by the necessity of repetitively responding to the same initial prompts can make input mistakes, further frustrating testers and exasperating an already tedious process.

SUMMARY OF THE INVENTION

Subject matter disclosed within the present invention details a method for automating input when testing voice-enabled applications. The present invention details a convenient way to save user input from one test session so that the input can be played back during a subsequent test session. The present invention can overcome the difficulties associated with manually providing input to proceed through a known portion of code during testing. Additionally, the invention can be performed in a complex environment typical of a voice-enabled application that utilizes a voice browser and one or more speech processing services to perform speech processing tasks on a turn-by-turn basis.

The present invention can be implemented in accordance with numerous aspects consistent with material presented herein. For example, one aspect of the present invention can include a method for automating an input process during a testing of a voice-enabled application so that a tester is not required to manually respond to each prompt of the voice-enabled application. The method includes the step of identifying a session input store that includes input data associated with voice-enabled application prompts and the step of executing the voice-enabled application. The voice-enabled application can prompt for user input that is to be used when performing a speech processing task. Input data from the session input store can be automatically extracted responsive to the prompting and used in place of manually entered input. The speech processing service can perform the speech processing task based upon the extracted data.

Another aspect of the present invention can include a system for testing voice-enabled applications. The system can include a voice browser, one or more speech processing services, a session input store, and a user interface. The voice browser can interpret voice-based markup code. Each speech processing service can perform a speech processing task for the voice-based application responsive to a request originating from the voice browser. The session input store can store input data used by the speech processing service for a plurality of different sessions. The user interface can include a session selection feature and a test session feature.

The session selection feature can permit a user to select one of the different sessions. Selection of the test session feature can result in the execution of the voice-enabled application. During the execution, the speech processing service can perform the speech processing task using input data automatically extracted from the session input store, wherein the input data is associated with the user selected session. The execution of the voice-enabled application can proceed with the automatically extracted input data being used in response to prompts for input until no input data is found within the session input store that corresponds to a prompt for input.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
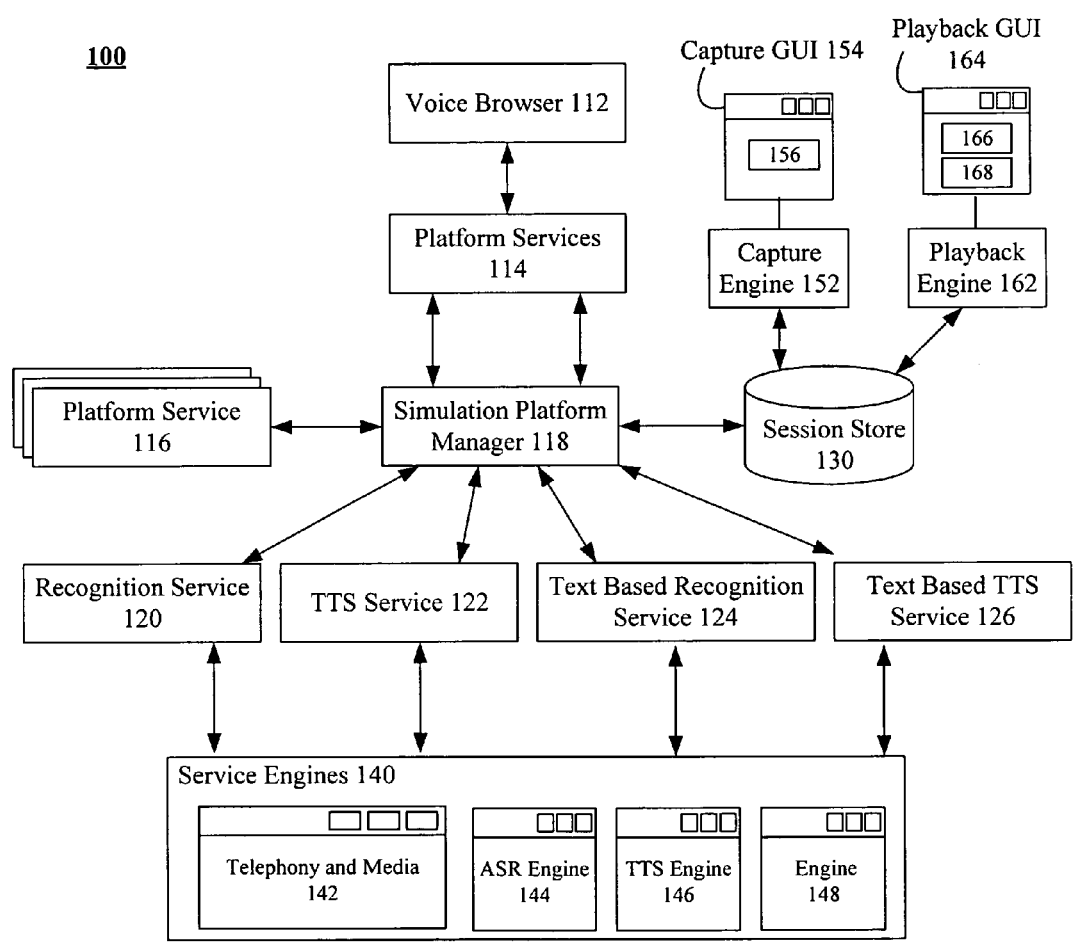
FIG. 1 is a schematic diagram illustrating a system for automating input when testing voice-enabled applications in accordance with an embodiment of the inventive arrangements disclosed herein.

FIG. 1 is a schematic diagram illustrating a system 100 for automating input when testing voice-enabled applications in accordance with an embodiment of the inventive arrangements disclosed herein. The system 100 can utilize a session store 130 that contains input data that can be used during testing. The information within the session store 130 can be automatically supplied to a component of the voice-enabled application responsive to prompts for input, thereby automating the input process during testing so that a tester is not required to manually respond to the prompts from the voice-enabled application.

Regardless of the complexity of the test environment, the session store 130 can be used to automate the input process. That is, the test environment in which the voice-enabled application represented by system 100 is deployed can be a simple environment including a single test machine or can be a complex, distributed environment including a voice browser 112 that utilizes a plurality of platform services 114. For example, the voice-enabled application represented within system 100 can be a turn-based voice-enabled application that utilizes one or more clusters of speech processing actions to perform speech processing tasks. The invention is not to be limited in this regard, however, and in another example, the voice-enabled application represented within system 100 can be a desktop voice-enabled application that utilizes local resources to provide the speech processing services.

A simulation platform manager 118 can be optionally configured to simulate interactions of multiple distributed computing machines and distributed components within a more controlled computing space. The simulation platform manager 118 can be used to manage a plurality of simulated services or services that are specifically configured for testing purposes. These services can include, but are not limited to, platform service 116, recognition service 120, text-to-speech (TTS) service 122, text based recognition service 124, and text based TTS service 126. In performing the services, the platform service 114 and/or 116 can use one or more service engines 140, such as a telephony and media engine 142, an automatic speech recognition (ASR) engine 144, a text-to-speech engine 146, and other such engines 148.

The voice browser 112 can include a voice-enabled application that interprets voice markup languages to generate voice output and interpret voice input. As used herein, a voice markup language generally refers to a variety of voice-enabled languages including, but not limited to, a Voice eXtensible Markup Language (VoiceXML), a Speech Application Language Tags (SALT) language, an XML+Voice Profiles (X+V) language, a Speech Synthesis Markup Language (SSML), and other voice-enabled languages. In one embodiment, the voice browser 112 can operate in a centralized server or within a cluster of services that houses voice resources to handle voice-enabled markup, like VoiceXML-tagged content.

The data of the session store 130 can be specifically tailored for one or more speech processing services. For example, the speech processing services can perform programmatic actions on a per-turn basis, and the session input store 130 can include an entry of input data for each turn to be supplied as needed. In one configuration, the session store can include raw input that can be provided to a platform service 116, such as a recognition service 120 or a text-to-speech service 122. For example, the session store 130 can include audio files to be supplied to the recognition service 120 that prompts for an utterance. The session store 130 can also include textual input to be supplied text-based services, such as text based recognition service 124 and text based TTS service 126.

The session store 130 can also include data input customized for test-specific components, such as the text based recognition service 124 or the text based TTS service 126. These customized components can receive and process formatted data entries in place of raw data, which can be extremely useful during the testing process since these customized components give a tester enhanced control of a test situation. That is, a tester can specify an input in an appropriate syntax to allowing testing of an input-dependent path.

For example, a tester using the text based recognition service 124 can specify speech-recognition conditions or results, such as an 80 percent confidence level that an utterance is the word "cat", a 60 percent confidence level that the same utterance was the word "bat", and a 30 percent confidence level that the utterance was the word "fat". The customized components have been called "text based" components because testers typically specify the recognition conditions and/or TTS conditions as textual entries. It should be appreciated, however, that the invention is not limited in this regard and adaptations can be made to accept any format of input, text based or otherwise.

Further, the session store 130 can also include one or more special commands that can be interpreted by a speech processing service. Special commands can include, but are not limited to, the NOMATCH command, the NOINPUT command, and the NOINPUTNOW command.

The NOMATCH command is interpreted by the text based Recognition Service 124 as speech utterance for which no matching entry having a minimal confidence threshold can be detected. Similarly, the NOMATCH command can be interpreted by the text based TTS service 126 as an input having no matching audio entry associated with it. The NOINPUT command is interpreted as an event where no input has been provided and results in delays or pauses during testing to signify a time-out period in which an input requesting component awaits input. The NOINPUTNOW command is interpreted as a non input event and results in no delays during testing. Accordingly, a tester can selectively utilize either the NOINPUT or the NOINPUTNOW commands interchangeably depending on whether pauses are desired after input is prompted for during testing or not.

A capture engine 152 and a playback engine 162 can interface with the session store 130. The capture engine 152 can capture user-provided input used during one test session, and can store data related to this input within the session store 130. The stored data is not necessarily identical to the user-provided input. For example, if the user-provided input is a speech utterance, the capture engine 152 can store the speech utterance in the session store 130, which can be used by the recognition service 120 as input for subsequent sessions, or can store textual results of the speech-to-text conversion of the utterance, which can be used by the text based recognition service 124 as input for subsequent sessions.

The playback engine 162 can detect a prompting for input, can look-up appropriate responsive data from the session store 130 for the prompting, and can automatically extract this responsive data so that manual input for at least a portion of the prompts is unnecessary during testing. The playback engine 162 can provide input for various ones of the platform services 114 or 116, for recognition service 120, for TTS service 122, for text based recognition service 124, for text based TTS service 126, for voice browser 112, and/or for the service engines 140.

In one embodiment, a capture graphical user interface (GUI) 154 having at least one capture input feature 156 can be used to interface with the capture engine 152. The capture input feature 156 can permit a user to selectively turn on/off the recording of information associated with user-provided input to the session store 130. In one contemplated configuration, a window can display the input being captured and stored within the session store. The GUI 154 can permit a user to establish configurable parameters regarding the input capture, such as whether to capture raw input to be used by a speech processing service or to capture derived input to be used by a text based speech processing service. Additionally, the capture GUI 154 can provide the tester with the ability to halt processing and to manually edit the captured input that is being recorded.

In another embodiment, a playback GUI 164 having a session selection feature 166 and a test session feature 168 can be used to interface with the playback engine 162. The session selection feature 166 can permit a user to designate a particular session associated with stored input that is contained within the session input store 130. The test session feature 166 can result in the execution of the voice-enabled application. During execution, prompting for input can be automatically provided to requesting components using data extracted from the session store 130 that is associated with the designated session.

In one contemplated configuration, the playback GUI 164 can include various control mechanisms in addition to the session selection feature 166 and the test session feature 168. The playback GUI 164 can include various debugging windows that permit a tester to examine system state information of parameters, output, code routines, and the like, as the voice-enabled application executes. The playback GUI 164 can also include step-through, delay, and halt features that allow the tester to control the pace at which test code is executed and input is automatically provided.

It should be appreciated that the arrangements shown in FIG. 1 are for illustrative purposes only and that the invention is not strictly limited in this regard. For example, the invention disclosed herein is not limited to the use of voice-browsers, such as voice browser 112, but can instead be applied to any voice-enabled application, which utilizes one or more speech services to perform speech processing tasks. The various browsers, logs, services, and engines of system 100 can be implemented in a distributed or centralized fashion.

In one embodiment, the voice-enabled application can be a telephony-based application whereby a user accesses a voice-enabled application through a telephone interface. In such an embodiment, the testing environment can be configured to accept DTMF (keypad) input as well as voice input and to provide speech responses. Even so, for testing purposes, many speech inputs directed to recognition service 120 can be replaced with text inputs directed to text based recognition service 124 and/or speech outputs generated by TTS service 122 can be selectively replaced with text outputs generated by text based TTS service 126.

While it is typical for speech processing service engines 140 to be arranged as a cluster of engines, non-clustered architectures, such as an architecture consisting of a discrete, stand-alone speech processing engine, are also contemplated herein. Additionally, the functionality attributable to the various components of system 100 can be combined or separated in different manners than those illustrated herein. For instance, the recognition service 120 and text based recognition service 124 can be implemented as a single integrated component in one embodiment of the present invention. In another embodiment of the present invention, the session log 130 can be implemented within a plurality of separate logs. In still another embodiment of the present invention, the session log 130 can log information for multiple sessions within a single file or data storage space. Such an embodiment can include a mechanism to query the data storage space by session or can include a mechanism to extract session-specific log information.

It should be emphasized that the session log 130 can record events, conditions, and other state information as activities are performed within the environment of system 100. Additionally, the session log 130 can include session-specific information or can include session-agnostic information. In one embodiment, the session log 130 can be constructed from pre-existing operational logs after the occurrence of an operational problem.

In such an embodiment, one or more scripts can be executed to parse out existing log files for a session and to associate the parsed log information with recognition events. After extracting information from pre-existing logs, the gathered information can be formatted in an appropriate manner and the session log 130 can be constructed. The ability to generate a session log 130 from pre-existing information can be very useful in situations where a large operational infrastructure exists, which needs to be maintained, since dynamically constructing session logs 130 from pre-existing infrastructure logs permits a business to utilize the benefits from a training environment, without incurring substantial new operating costs.

For example, the existing Web Sphere Voice Response® platform from International Business Machines Corporation (IBM) of Armonk, N.Y., does not currently include a text based platform, but a text based VoiceXML simulator could be added to the platform, thereby permitting the platform to advantageously utilize the concepts disclosed herein without dramatically altering the operational infrastructure of the platform. Likewise, the capture GUI 154 and Playback GUI 164 as described herein could be advantageously integrated with components of the Web Spheres platform or other such voice response platforms or development toolkits.

Figure 2:
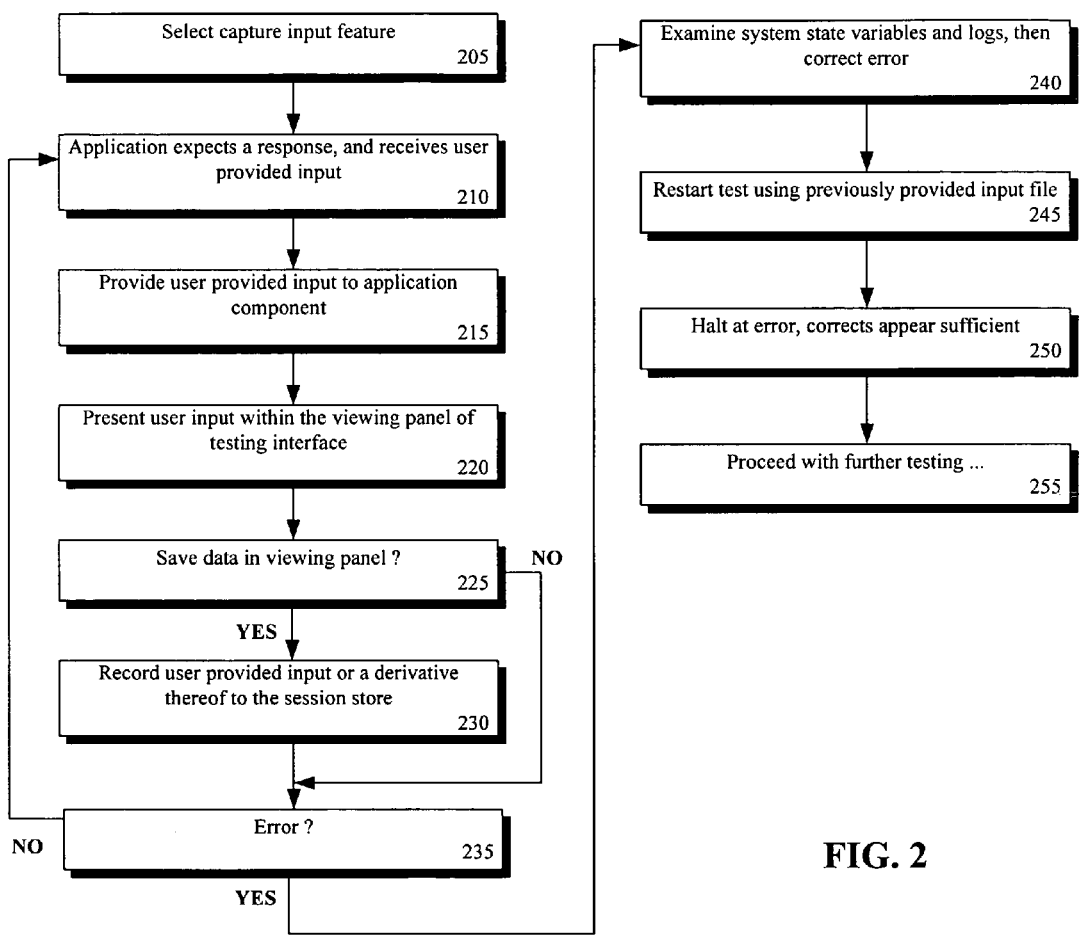
FIG. 2 is a flowchart illustrating a method for automating input when testing voice-enabled applications in accordance with an embodiment of the inventive arrangements disclosed herein.

FIG. 2 is a flowchart illustrating a method 200 for capturing input to be used when testing voice-enabled applications in accordance with an embodiment of the inventive arrangements disclosed herein. The method 200 can be performed in the context of a system in which a voice-enabled application can be tested, such as system 100. For example, the method 200 can begin in a stage where a developer or tester has written a portion of a voice-enabled application and is ready to test it. The written portion of code can be written in a voice-based markup language, such as Voice XML.

Method 200 can begin in step 205 where the developer selects a capture input feature. In step 210, when the application expects a user response, the developer can type or speak an input. In step 215, the input can be provided to the application component that is expecting the response. For example, if a voice browser component of the voice-enabled application is expecting a spoken utterance, the user supplied utterance or textually entered simulation thereof can be provided. In step 220, the input can be simultaneously presented within a separate viewing window or panel of the application testing interface.

In step 225, the developer can save the data appearing within the viewing panel, either manually by selecting an input save button or automatically in accordance with configurable parameters. In step 230, the selected save operation can record the user-input data into a session store, which can be used to automate input for other testing sessions.

In step 235, for example, the developer can save the input upon reaching a code portion containing an error. In step 240, the developer can examine system state variables and logs to find and correct the error. In step 245, the developer can restart the application, selecting to utilize the input from the previously captured session.

In step 250, because the input has already been recorded, prompts are automatically responded to and the tested application can automatically progress to the point of code where the error was previously discovered. In one embodiment, as input is automatically being supplied from the session store, the viewing panel can be displayed that contains the previously captured information. The most current utilized entry corresponding to a particular input can be highlighted within this viewing panel as the application is automatically executed. In step 255, assuming the error has been corrected, the voice-application can proceed. At this point, the tester can decide whether to capture new input to the session input file or not. When the developer chooses to capture new input or if the test interface is still in a capture input mode, subsequent inputs can be captured as testing continues.

Figure 3:
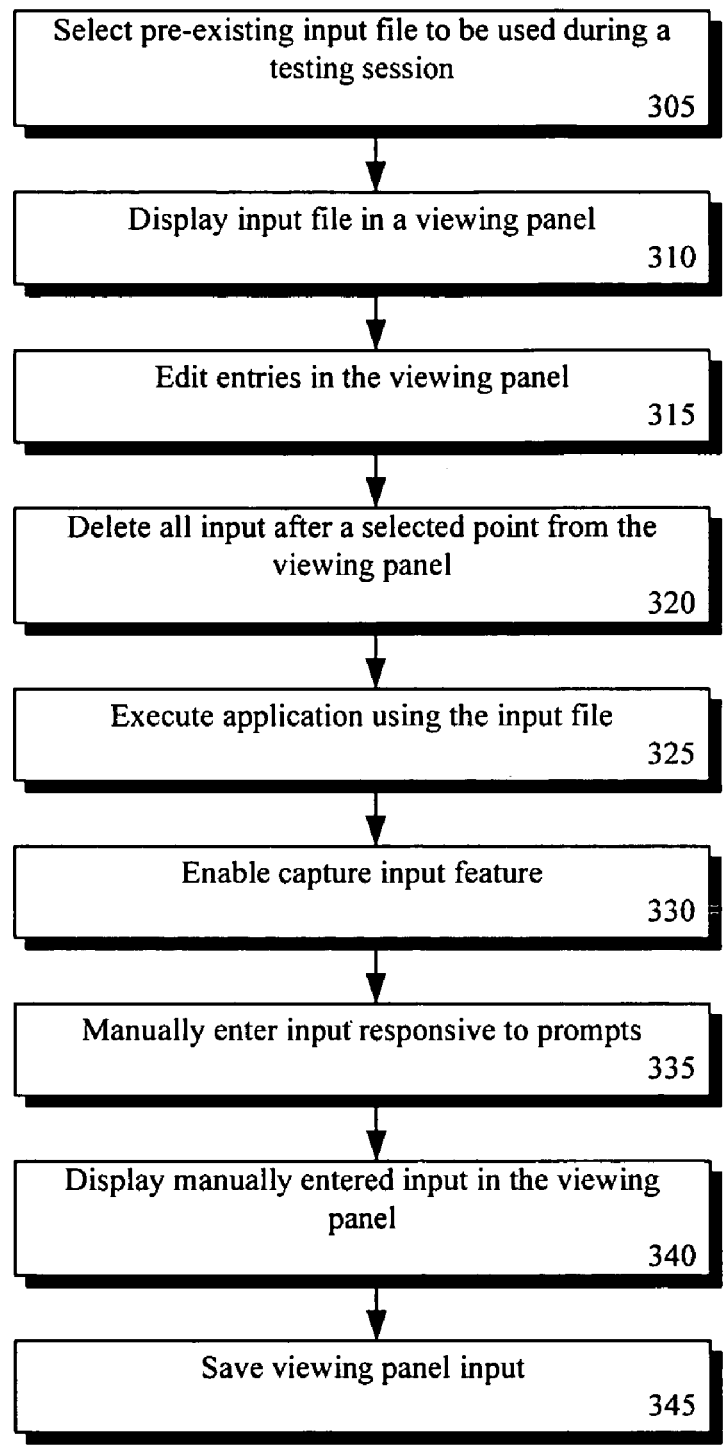
FIG. 3 is a flowchart illustrating a method for utilizing previously recorded input when testing voice-enabled applications in accordance with an embodiment of the inventive arrangements disclosed herein.

FIG. 3 is a flowchart illustrating a method 300 for utilizing previously recorded input for testing voice-enabled applications in accordance with an embodiment of the inventive arrangements disclosed herein. The previously recorded input can be manually recorded into the session store by developers, can be extracted from a pre-existing repository containing "canned" responses, can result from input captured from previous test sessions, or can be automatically generated from system information. For example, scripts can be used to automatically generate a session input file from existing session log files. The session log files can be log files from a test environment or can be log files from real interactions that occurred in a production environment.

Method 300 can begin in step 305, where a user selects a pre-existing input file to be used for a testing session. In step 310, the selected input file can be displayed in a viewing panel. In step 315, entries in the viewing panel can be edited, thereby creating a new input pathway for at least a portion of the current test. In step 320, for example, all input after a certain point can be deleted from the input panel. In step 325, the application can be executed using the input file, which halts at the point that the input ends. In step 330, a user can enable a capture input feature. In step 335, the user can thereafter manually enter input responsive to prompts. In steps 340 and 345, the new input can appear in the viewing panel and be manually or automatically saved by the user.

It should be appreciated that the viewing panel is not necessary for enabling the method 300 and that input can be extracted from the storage session file without being displayed to the user. Use of the viewing panel, however, can facilitate the testing or software development process.

It should also be appreciated, that when a portion of code is being tested which a corresponding input data has contained within the input data store, the code can automatically run from beginning to end, assuming the code does not contain program errors that cause the associated routines to malfunction. Consequently, once code modules and corresponding input files are constructed, software code can be iteratively tested using the input files to quickly identify errors, thereby expediting the testing phase of the software development lifecycle.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. An input automation method for automating input when testing voice-enabled applications comprising steps of:
   while a voice-enabled application that prompts for user input is executing during a first session;
      receiving input data from a user in response to a first instance of a first portion of a series of prompts of the voice-enabled application, the input data causing progress to a first point in the voice-enabled application; and
      recording the input data in a session input store;
   automatically accessing the input data from the session input store;
   editing the accessed input data to create edited accessed input data; and
   while the voice-enabled application is executing during a second session;
      providing said edited accessed input data to the voice-enabled application in lieu of user input in response to a second instance of at least some of the first portion of the series of prompts of the voice-enabled application to progress to a second point in the voice-enabled application, wherein at the completion of providing said edited accessed input data, the voice-enabled application has progressed to the second point in the voice-enabled application; and
      receiving input data from a user in response to a second portion of the series of prompts of the voice-enabled application, the second portion of the series of prompts progressing from the second point in the voice-enabled application.

2. The method of claim 1, wherein said voice-enabled application, while executing, performs programmatic actions on a per-turn basis, and wherein the method comprises providing edited accessed input data at each turn.

3. The method of claim 2, wherein said voice-enabled application includes a voice browser that interprets voice-based markup code, and wherein the method further comprises performing a speech processing task for the voice-enabled application by a speech processing service responsive to a request originating from the voice browser.

4. The method of claim 3, wherein:
   the speech processing service is a text based service;
   performing a speech processing task by the speech processing service comprises simulating by the text based service for testing purposes a speech processing task, wherein said simulated speech processing task utilizes textual input and does not utilize audio input.

5. The method of claim 3, wherein the speech processing task is a speech-to-text conversion task.

6. The method of claim 4, wherein the speech processing task being simulated by the text based service is a text-to-speech generation task.

7. The method of claim 1, further comprising steps of:
   repeating said providing said edited accessed input data until a halt condition is encountered;
   upon encountering the halt condition, halting execution of the voice-enabled application; and
   permitting an authorized user to observe system state as it existed at a time in which the halt condition was encountered.

8. The method of claim 7, wherein the halt condition includes at least one condition selected from the group consisting of a condition invoked by an explicit halt command and a condition resulting when no corresponding edited accessed input data is found that is responsive to said prompting step.

9. The method of claim 1, wherein the method comprises performing the receiving and recording steps repeatedly during the first session and performing the providing step repeatedly during the second session.

10. The method of claim 9, further comprising steps of:
    providing a graphical user interface configured with a capture input feature;
    receiving a user selection of the capture input feature during the first session to begin recording the input data to the session input store; and
    detecting an indication to stop the recording of the input data during the first session.

11. The method of claim 1, wherein the session input store includes input data associated with a plurality of different sessions, said method further comprising steps of:
    detecting input from the user indicating that the first session is a user-selected one of the different sessions; and
    utilizing input data associated with the detected user-selected session when conducting the accessing and providing steps.

12. The method of claim 1, wherein a text based service performs a speech-to-text conversion task for the voice-enabled application responsive to the provided edited accessed input data, and wherein the edited accessed input data comprises at least one text phrase and an associated confidence level for the at least one text phrase.

13. The method of claim 1, wherein a text based service performs a speech-to-text conversion task for the voice-enabled application responsive to the provided edited accessed input data, and wherein the edited accessed input data comprises a special command interpreted by the text based service, wherein said special command is selected from the group consisting of a nomatch command, a noinput command, and a noinputnow command.

14. A system for testing voice-enabled applications comprising:
a voice browser that interprets voice-based markup code;
a session input store configured to store input data associated with a voice-enabled application that prompts for user input, at least some of the input data being associated with at least one session of a plurality of execution sessions of the voice-enabled application;
a capture engine, that while the voice-enabled application is executing during a session of the plurality of execution sessions;
receives user-provided input data in response to a first instance of a first portion of prompts of the voice-enabled application, the input data causing progress to a first point in the voice-enabled application; and
stores the user-provided input data in the session input store as being associated with the session;
a user interface comprising a session selection feature, said session selection feature permitting a user to select one of said plurality of execution sessions, wherein the user interface receives user-provided input data in response to a second portion of prompts of the voice-enabled application, the second portion of prompts progressing from a second point in the voice-enabled application; and
a playback engine, that;
automatically accesses input data from the session input store;
edits the accessed input data to create edited accessed input data; and
during execution of the voice-enabled application, provides the edited accessed input data to the voice-enabled application in lieu of user input in response to a second instance of at least some of the first portion of prompts of the voice-enabled application to progress to the second point in the voice-enabled application, wherein at the completion of providing said edited accessed input data, the voice-enabled application has progressed to the second point in the voice-enabled application.

15. The system of claim 14, wherein:
the user interface further comprises a capture input feature configured to permit a user to enable and disable the capture input feature;
when enabled, the capture input feature interfaces with the capture engine to cause the capture engine to store the user-provided input in the session input store.

16. The system of claim 14, wherein the automatically accessed input data comprises a plurality of special commands, said special commands including a nomatch command, a noinput command, and a noinputnow command.

17. A non-transitory machine-readable recording medium having stored thereon a computer program having a plurality of code sections, said code sections, when executed by a machine, cause the machine to perform steps of:
while a voice-enabled application that prompts for user input is executing during a first session;
receiving input data from a user in response to a first instance of a first portion of a series of prompts of the voice-enabled application, the input data causing progress to a first point in the voice-enabled application; and
recording the input data in a session input store;
automatically accessing the input data from the session input store;
editing the accessed input data to create edited accessed input data; and
while the voice-enabled application is executing during a second session;
providing said edited accessed input data to the voice-enabled application in lieu of user input in response to a second instance of at least some of the first portion of the series of prompts of the voice-enabled application to progress to a second point in the voice-enabled application, wherein at the completion of providing said edited accessed input data, the voice-enabled application progressed to the second point in the voice-enabled application; and
receiving input data from a user in response to a second portion of the series of prompts of the voice-enabled application, the second portion of the series of prompts progressing from the second point in the voice-enabled application.

18. The non-transitory machine-readable recording medium of claim 17, wherein the code sections cause the machine to perform the steps of receiving and recording repetitively during the first session and to perform the step of providing repetitively during the second session.

19. The non-transitory machine-readable recording medium of claim 18, wherein the code sections further cause the machine to perform, steps of:
providing a graphical user interface configured with a capture input feature;
receiving a user selection of the capture input feature during the first session to begin recording the input data to the session input store; and
detecting an indication to stop the recording of the input data during the first session.

* * * * *